United States Patent
Birch

(10) Patent No.: US 10,384,500 B2
(45) Date of Patent: Aug. 20, 2019

(54) HITCH CUSHION SYSTEM

(71) Applicant: Douglas Birch, Virginia Beach, VA (US)

(72) Inventor: Douglas Birch, Virginia Beach, VA (US)

(*) Notice: Subject to any disclaimer, the term of this patent is extended or adjusted under 35 U.S.C. 154(b) by 62 days.

(21) Appl. No.: 15/629,743

(22) Filed: Jun. 22, 2017

(65) Prior Publication Data

US 2018/0370307 A1   Dec. 27, 2018

(51) Int. Cl.
  *B60D 1/24* (2006.01)
  *B60D 1/06* (2006.01)
  *B60D 1/60* (2006.01)
  *B60D 1/00* (2006.01)

(52) U.S. Cl.
  CPC ........... *B60D 1/243* (2013.01); *B60D 1/06* (2013.01); *B60D 1/065* (2013.01); *B60D 1/60* (2013.01); *B60D 2001/008* (2013.01)

(58) Field of Classification Search
  CPC .......... B60D 1/243; B60D 1/065; B60D 1/06; B60D 2001/008
  USPC .......................................................... 293/117
  See application file for complete search history.

(56) References Cited

U.S. PATENT DOCUMENTS

| | | |
|---|---|---|
| 5,575,494 A | 11/1996 | DeVries |
| 5,651,559 A | 7/1997 | Liland et al. |
| 5,785,218 A | 7/1998 | IaLone et al. |
| 5,791,677 A | 8/1998 | Froehlich |
| 6,039,339 A | 3/2000 | Bello |
| D499,065 S | 11/2004 | Shapiro et al. |
| 6,913,278 B1 | 7/2005 | Laska |
| 6,938,912 B1* | 9/2005 | Norton ............... B60D 1/06 280/507 |
| 7,677,589 B2* | 3/2010 | Prine ................. B60D 1/60 280/507 |
| 2010/0320730 A1 | 12/2010 | Ferland |
| 2012/0235383 A1 | 9/2012 | Hanes, Jr. |

FOREIGN PATENT DOCUMENTS

WO   WO2007015119   2/2007

* cited by examiner

*Primary Examiner* — Joseph D. Pape
*Assistant Examiner* — Dana D Ivey

(57) ABSTRACT

A hitch cushion system for inhibiting a vehicle from being damaged while backing toward a trailer includes a trailer that has a ball receiver. A cushion unit is removably coupled to the ball receiver and the cushion unit extends outwardly beyond a perimeter of the ball receiver. In this way the cushion unit inhibits a vehicle from striking the ball receiver when the vehicle is backing toward the ball receiver. The cushion unit is substantially comprised of a resiliently compressible material to inhibit the vehicle from being damaged when the vehicle contacts the cushion unit.

5 Claims, 3 Drawing Sheets

HITCH CUSHION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to cushion devices and more particularly pertains to a new cushion device for inhibiting a vehicle from being damaged while backing toward a trailer.

BRIEF SUMMARY OF THE INVENTION

An embodiment of the disclosure meets the needs presented above by generally comprising a trailer that has a ball receiver. A cushion unit is removably coupled to the ball receiver and the cushion unit extends outwardly beyond a perimeter of the ball receiver. In this way the cushion unit inhibits a vehicle from striking the ball receiver when the vehicle is backing toward the ball receiver. The cushion unit is substantially comprised of a resiliently compressible material to inhibit the vehicle from being damaged when the vehicle contacts the cushion unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
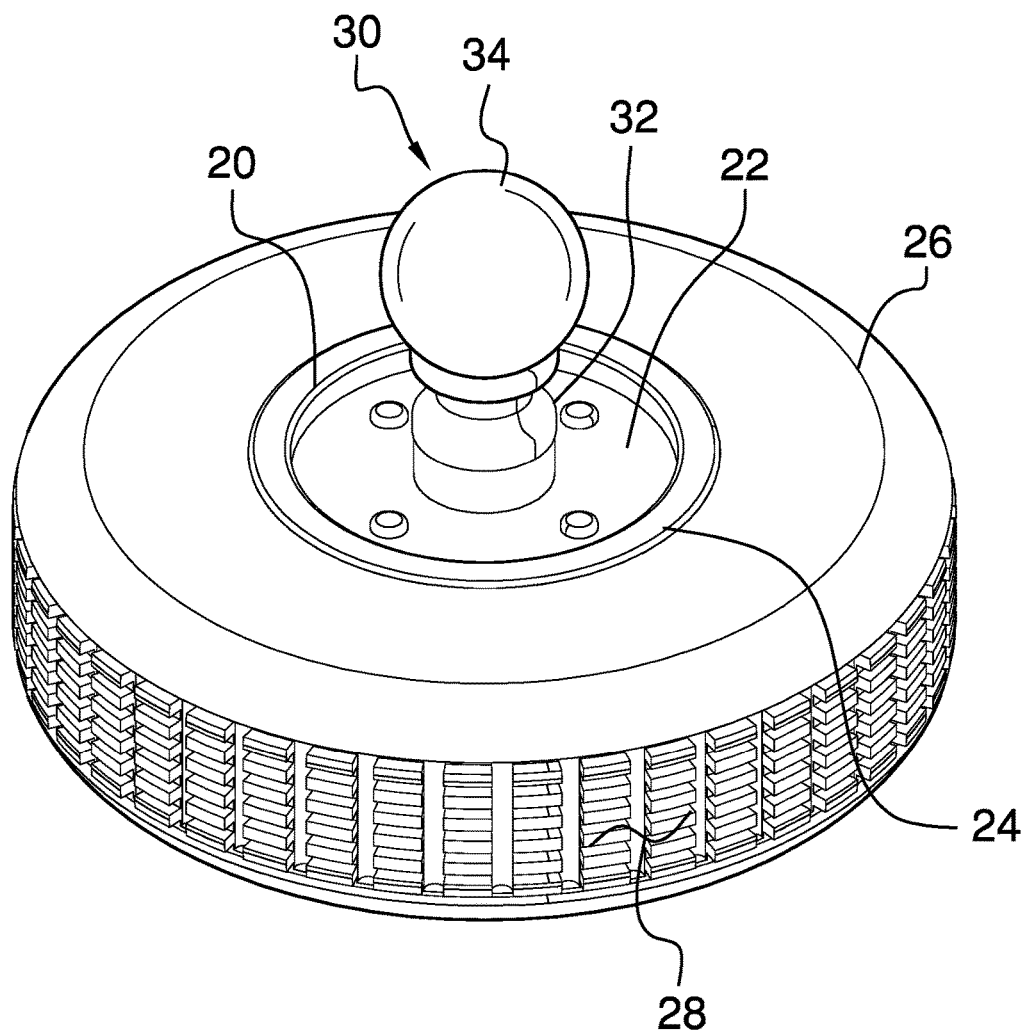
FIG. 1 is a perspective view of a cushion unit of a hitch cushion system according to an embodiment of the disclosure.
Figure 2:
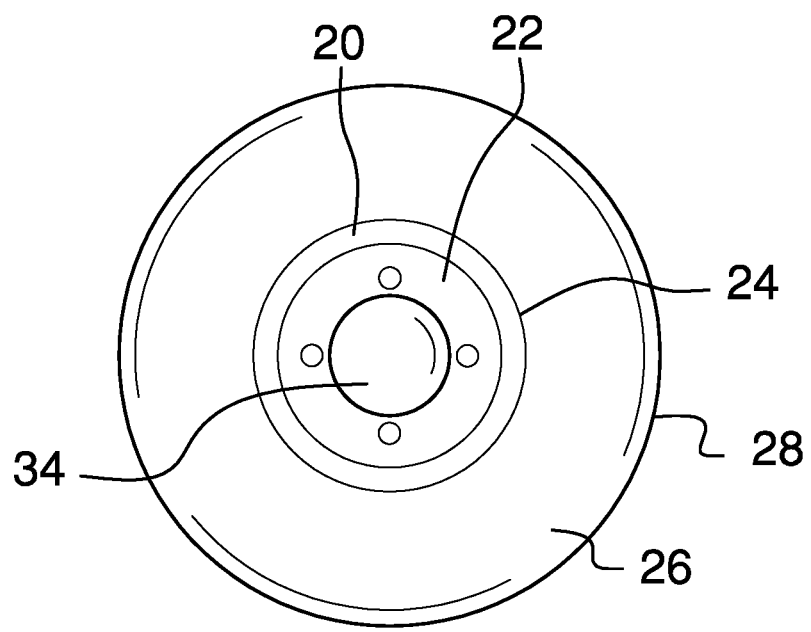
FIG. 2 is a top view of cushion unit of an embodiment of the disclosure.
Figure 3:
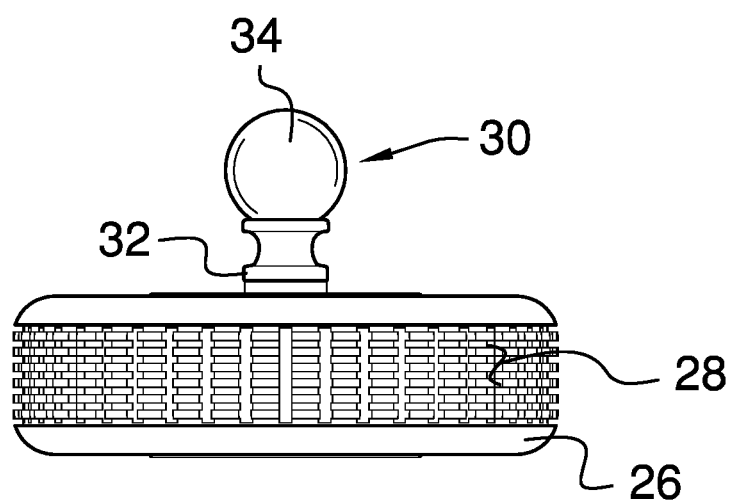
FIG. 3 is a right side view of cushion unit of an embodiment of the disclosure.
Figure 4:
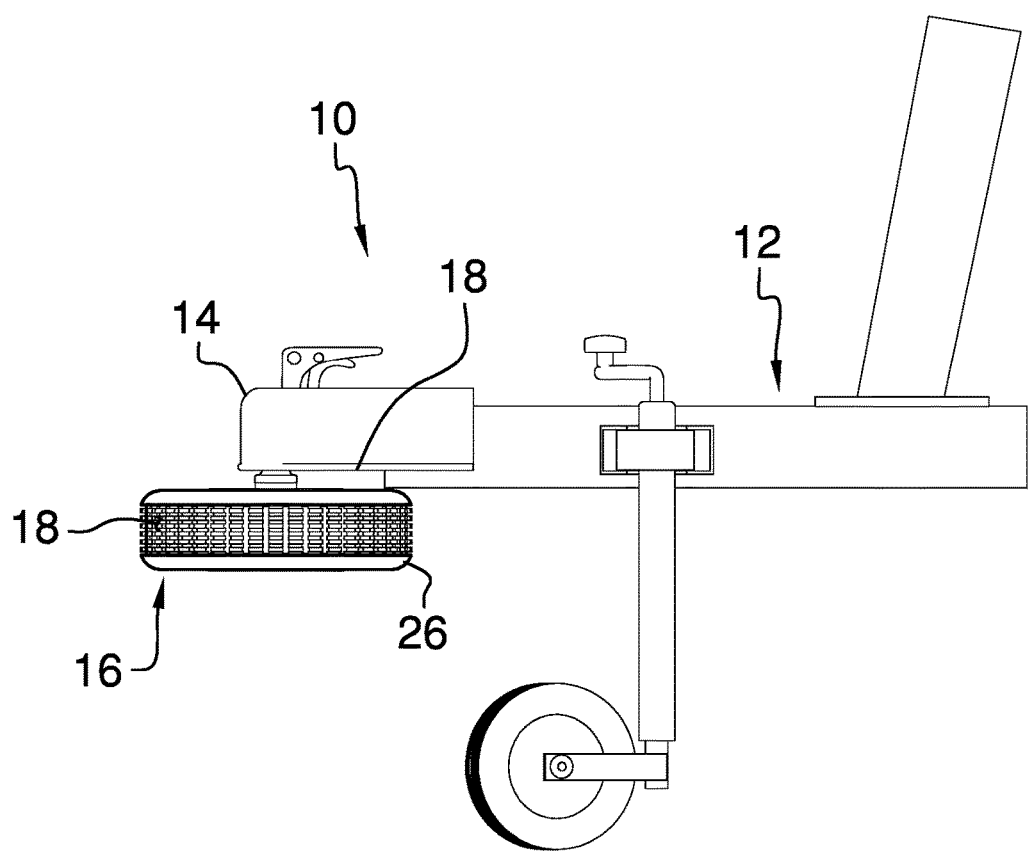
FIG. 4 is a perspective in-use view of an embodiment of the disclosure.

With reference now to the drawings, and in particular to FIGS. 1 through 4 thereof, a new cushion device embodying the principles and concepts of an embodiment of the disclosure and generally designated by the reference numeral 10 will be described.

As best illustrated in FIGS. 1 through 4, the hitch cushion system 10 generally comprises a trailer 12 that has a ball receiver 14. The trailer 12 may be a boat trailer, a cargo trailer and any other trailer 12 that has a ball receiver 14. Additionally, the ball receiver 14 may be a ball receiver 14 of any conventional design to include, but not be limited to, 1⅞ inch ball receivers and 2 inch ball receivers. A cushion unit 16 is removably coupled to the ball receiver 14. The cushion unit 16 extends outwardly beyond a perimeter 18 of the ball receiver 14 when the cushion unit 16 is coupled to the ball receiver 14. In this way the cushion unit 16 inhibits a vehicle from striking the ball receiver 14 when the vehicle is backing toward the ball receiver 14. Moreover, the cushion unit 16 is substantially comprised of a resiliently compressible material to inhibit the vehicle from being damaged when the vehicle contacts the cushion unit 16.

The cushion unit 16 comprises a wheel 20 that has a top side 22 and a perimeter side 24. A tire 26 is coupled to the perimeter side 24 of the wheel 20 and the tire 26 is coextensive with the perimeter side 24. The tire 26 has an outwardly facing surface 28 with respect to the wheel 20 and the tire 26 is comprised of a resiliently compressible material. The tire 26 and the wheel 20 may have a combined diameter ranging between approximately 25.0 cm and 30.0 cm. Additionally, the tire 26 may be a pneumatic tire, a solid rubber tire and any other conventional rubber tire.

A hitch 30 is coupled to and extends upwardly from the top side 22 of the wheel 20 and the hitch 30 is centrally positioned on the wheel 20. The hitch 30 includes a stem 32 extending upwardly from the wheel 20 and a ball 34 that is spaced from the wheel 20. The hitch 30 may be a ball hitch of any conventional design, to include but not be limited to, 1⅞ inch ball hitches and 2 inch ball hitches. The ball receiver 14 insertably receives the ball 34 such that the wheel 20 is removably coupled to the trailer 12. Additionally, the outwardly facing surface 28 of the tire 26 is spaced outwardly from the perimeter 18 of the ball receiver 14. In this way the outwardly facing surface 28 engages the vehicle before the vehicle engages the ball receiver 14 thereby reducing the likelihood that the vehicle will be damaged.

In use, the ball 34 is coupled to the ball receiver 14 when the trailer 12 is parked and not connected to a vehicle. Thus, the wheel 20 and the tire 26 are suspended beneath the ball receiver 14 and the outwardly facing surface 28 of the tire 26 extends outwardly beyond the perimeter 18 of the ball receiver 14. The outwardly facing surface 28 of the tire 26 engages the vehicle when the vehicle is backing toward the ball receiver 14 before the vehicle engages the ball receiver 14. In this way the tire 26 inhibits the ball receiver 14 from damaging the vehicle that results from contact between the vehicle and the ball receiver 14. Additionally, the tire 26 inhibits a person's leg from inadvertently striking the ball receiver 14 thereby reducing the likelihood of injuries caused by striking the ball receiver 14. The ball 34 is removed from the ball 34 receiver when the vehicle is positioned sufficiently close to the trailer.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hitch cushion system comprising:
   a trailer having a ball receiver;
   a cushion unit being removably coupled to said ball receiver, said cushion unit extending outwardly beyond a perimeter of said ball receiver wherein said cushion unit is configured to inhibit a vehicle from striking said ball receiver when the vehicle is backing toward said ball receiver, said cushion unit being substantially comprised of a resiliently compressible material wherein said cushion unit is configured to inhibit the vehicle from being damaged when the vehicle contacts said cushion unit, said cushion unit comprising a wheel having a top side and a perimeter side; and
   a tire being coupled to said perimeter side of said wheel having said tire being coextensive with said perimeter side, said tire having an outwardly facing surface with respect to said wheel, said tire being comprised of a resiliently compressible material.

2. The system according to claim 1, further comprising a hitch being coupled to and extending upwardly from said top side of said wheel, said hitch being centrally positioned on said wheel.

3. A hitch cushion system comprising:
   a trailer having a ball receiver;
   a cushion unit being removably coupled to said ball receiver, said cushion unit extending outwardly beyond a perimeter of said ball receiver wherein said cushion unit is configured to inhibit a vehicle from striking said ball receiver when the vehicle is backing toward said ball receiver, said cushion unit being substantially comprised of a resiliently compressible material wherein said cushion unit is configured to inhibit the vehicle from being damaged when the vehicle contacts said cushion unit, said cushion unit comprising a wheel having a top side and a perimeter side;
   a hitch being coupled to and extending upwardly from said top side of said wheel, said hitch being centrally positioned on said wheel;
   said cushion unit including a tire having an outwardly facing surface; and
   said hitch including a stem extending upwardly from said wheel and a ball being spaced from said wheel, said ball receiver insertably receiving said ball such that said wheel is removably coupled to said trailer.

4. The system according to claim 3, wherein said outwardly facing surface of said tire being is outwardly from said perimeter of said ball receiver wherein said outwardly facing surface is configured to engage the vehicle before the vehicle engages said ball receiver.

5. A hitch cushion system comprising:
   a trailer having a ball receiver; and
   a cushion unit being removably coupled to said ball receiver, said cushion unit extending outwardly beyond a perimeter of said ball receiver wherein said cushion unit is configured to inhibit a vehicle from striking said ball receiver when the vehicle is backing toward said ball receiver, said cushion unit being substantially comprised of a resiliently compressible material wherein said cushion unit is configured to inhibit the vehicle from being damaged when the vehicle contacts said cushion unit, said cushion unit comprising:
      a wheel having a top side and a perimeter side,
      a tire being coupled to said perimeter side of said wheel having said tire being coextensive with said perimeter side, said tire having an outwardly facing surface with respect to said wheel, said tire being comprised of a resiliently compressible material; and
      a hitch being coupled to and extending upwardly from said top side of said wheel, said hitch being centrally positioned on said wheel, said hitch including a stem extending upwardly from said wheel and a ball being spaced from said wheel, said ball receiver insertably receiving said ball such that said wheel is removably coupled to said trailer having said outwardly facing surface of said tire being spaced outwardly from said perimeter of said ball receiver wherein said outwardly facing surface is configured to engage the vehicle before the vehicle engages said ball receiver.

* * * * *